United States Patent [19]
Lucs

[11] Patent Number: 5,860,566
[45] Date of Patent: Jan. 19, 1999

[54] APPARATUS AND METHOD FOR TRANSFERRING GRANULAR MATERIAL

[76] Inventor: David Lucs, P.O. Box 675, Syosset, N.Y. 11791

[21] Appl. No.: 966,499

[22] Filed: Nov. 7, 1997

Related U.S. Application Data

[62] Division of Ser. No. 560,996, Nov. 21, 1995, abandoned.

[51] Int. Cl.[6] .................................................... A01C 17/00
[52] U.S. Cl. .............................. 222/1; 222/157; 222/325; 222/609; 239/379; 239/681
[58] Field of Search ................................ 222/1, 157, 325, 222/608, 609, 613, 614, 619, 620, 623, 624, 625; 239/684, 664, 379, 681, 687

[56] References Cited

U.S. PATENT DOCUMENTS

| | | |
|---|---|---|
| 4,030,641 | 6/1977 | Bailey et al. . |
| 4,106,704 | 8/1978 | McRoskey et al . |
| 4,121,733 | 10/1978 | McRoskey et al. . |
| 4,180,184 | 12/1979 | Florer et al. . |
| 4,474,327 | 10/1984 | Mattson et al. . |
| 4,635,818 | 1/1987 | Glass . |

Primary Examiner—Kevin P. Shaver
Attorney, Agent, or Firm—Collard & Roe, P.C.

[57] ABSTRACT

An apparatus for dispensing granular material onto a surface including a hand-operated spreader. The spreader includes a hopper for containing the granular material with a feed opening through which the granular material is dispensed from the hopper. The apparatus further includes a storage bin for containing a quantity of the granular material. The storage bin is removably connected to the hopper so that the granular material is readily transferable between the hopper and the storage bin. A method for transferring and dispensing granular material is also disclosed where the spreader is inverted and connected to the top end of the storage bin. The assembly is then inverted for use. Thereafter, the assembly is inverted again and the spreader is disconnected from the storage bin. A separate lid covers the storage bin until it is further needed.

4 Claims, 1 Drawing Sheet

APPARATUS AND METHOD FOR TRANSFERRING GRANULAR MATERIAL

CROSS REFERENCE TO RELATED DOCUMENT

This is a divisional of Ser. No. 08/560,996, filed Nov. 21, 1995, now abandoned.

BACKGROUND OF THE INVENTION

1. Field of the Invention

The invention relates to an apparatus and device for transferring granular material to and from a spreader for dispensing onto a surface.

2. The Prior Art

Hand-operated devices for distributing granular materials on lawns are well known and have been in use for many years. Such devices are available in two general categories, a broadcasting type and a drop type. Due to the popularity of these spreaders, numerous patents have addressed various improvements, for example, U.S. Pat. No. 4,121,733 to McRoskey et al.; U.S. Pat. No. 4,180,184 to Florer et al.; U.S. Pat. No. 4,030,641 to Bailey et al.; U.S. Pat. No. 4,106,704 to McRoskey et al.; U.S. Pat. No. 4,635,818 to Glass; and U.S. Pat. No. 4,474,327 to Mattson et al. However, in spite of these improvements, numerous drawbacks still remain with these spreaders. Most spreaders have a hopper of limited capacity so that frequent refilling is required even for moderately-sized lawns. The limited size of the hopper is of far greater concern to professional landscapers having a need to fertilize large lawn areas. A different but related problem is emptying the hopper if excess granular material remains after the lawn has been completely fertilized. Although it is relatively easy to pour fertilizer from the paper bag in which it is shipped into the hopper, it is significantly more difficult to transfer the granular material back into the paper bag. Invariably, some fertilizer remains in the hopper which tends to have a corrosive effect on any metal parts of the spreader.

Accordingly, it would be desirable to provide a spreader with an increased capacity without significantly affecting the complexity or cost of such spreader. In addition, it would be desirable to provide a storage bin into which the fertilizer can be easily poured. The storage bin would ideally be sealed shut to prevent moisture from contacting the fertilizer and prevent the fertilizer from accidentally spilling out.

SUMMARY OF THE INVENTION

Accordingly, it is an object of the present invention to overcome the drawbacks of the prior art and to provide a spreader with a significantly-increased capacity for granular material to extend the time between refills.

It is a further object of the present invention to provide a storage container where excess granular material can be easily stored and protected from moisture.

These and other related objects are achieved according to the invention by an apparatus for dispensing granular material onto the surface. The apparatus comprises a hand-operated spreader including a hopper for containing the granular material with a feed opening through which the granular material is dispensed from the hopper. The apparatus further includes a storage bin for containing a quantity of the granular material. The storage bin is removably connected to the hopper so that the granular material is readily transferable between the hopper and the storage bin. The storage bin has a capacity of at least two to three times the capacity of the hopper. The storage bin includes means for determining the amount of granular material remaining therein. The determining means comprises a window extending along a portion of the storage bin for viewing the vertical height of the granular material remaining in the storage bin.

The removable connection between the hopper and the storage bin is a screw connection which seals the hopper to the storage bin to prevent granular material from spilling out during transfer. A threaded cap is also provided for removably sealing the storage bin following use of the spreader. The spreader includes means for controlling the rate at which the granular material is dispensed from the hopper. The removable connection between the hopper and the storage bin is alternatively a bayonet catch.

According to the invention, there is also disclosed a method for transferring and dispensing granular material onto a surface comprising the following steps. A hand-operated spreader is inverted on top of a storage bin with an open top end containing granular material. The spreader is connected to the open top end of the storage bin. The spreader with connected storage bin are inverted and the granular material is dispensed onto the surface.

Following use, the spreader with connected storage bin is inverted and the spreader is disconnected from the open top end of the storage bin. If any granular material remains in the storage bin, the storage bin is covered and stored. The spreader may be connected to the storage bin with a screw connection or a bayonet catch.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

In the drawing, wherein similar reference characters denote similar elements throughout the several views.

DETAILED DESCRIPTION OF THE PREFERRED EMBODIMENTS

Figure 1:
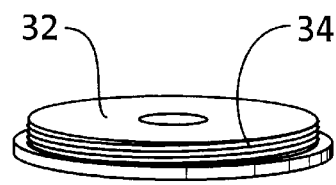
FIG. 1 is perspective view of a threaded cap for sealing the storage bin according to the invention.
Figure 2:
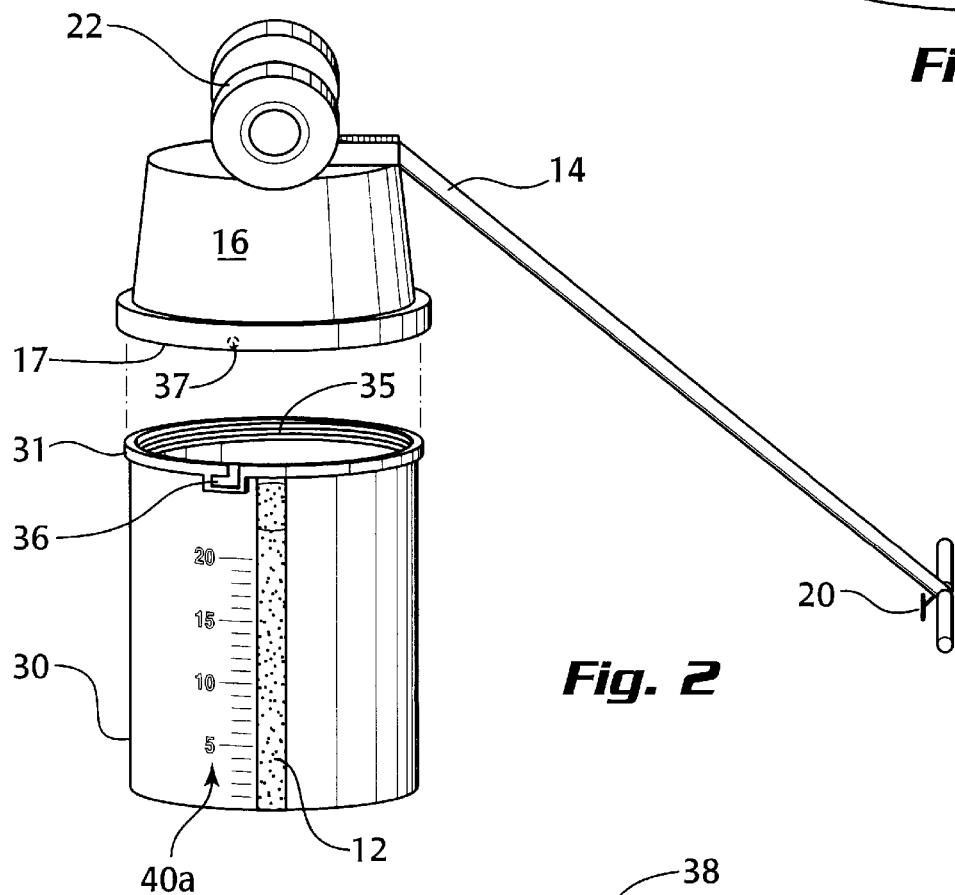
FIG. 2 is a perspective view of the storage bin and inverted spreader.
Figure 3:
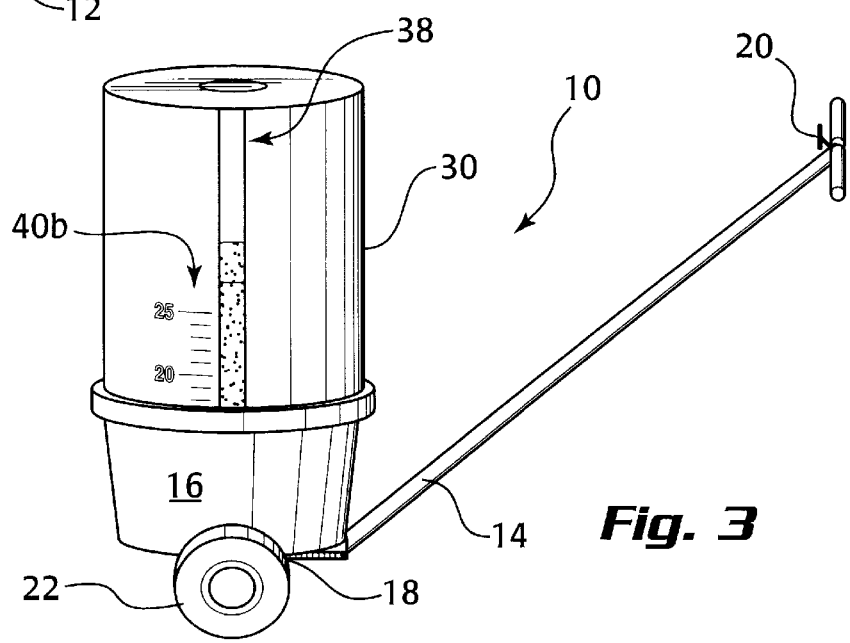
FIG. 3 is a perspective view of the spreader with the storage bin installed ready for use.

Referring in detail to the drawings, and in particular FIGS. 1, 2 and 3 there is shown an apparatus 10 for dispensing a granular material 12 onto a surface. The term "granular" or "granular material" is intended to apply to all granular material including fertilizers, seeds, chemicals or whatever other material is desired to spread over the surface. The apparatus has three separate parts including a spreader 14, a storage bin 30 and a lid 32 for the storage bin. Spreader 14 is a conventional drop-type or broadcast-type spreader with a specially-configured hopper 16. A rim 17 of hopper 16 has a particular configuration which corresponds to a rim configuration 31 on storage bin 30. Otherwise, spreader 14 has the conventional attributes of a feed opening 18, a control 20 for the feed opening and wheels 22.

As mentioned above, storage bin 30 has a rim configuration 31, which can be removably-connected to rim 17 of spreader 14. A lid 32 may also be removably-connected to rim 31 of storage bin 30. For example, screw threads 34 on lid 32 engage screw threads 35 on storage bin 30 for storing or transporting the storage bin 30. Additionally, storage bin 30 may be provided with a bayonet catch 36 for engaging a corresponding tab 37 on hopper 16. Storage bin 30 also includes a window 38 extending along the height of storage bin 30 for viewing the vertical height of granular material 12 contained within storage bin 30.

In use, apparatus 10 would operate as follows. Storage bin 30 would be filled with granular material 12. The level of granular material 12 is viewed through window 38 where it is compared with a gauge 40a to determine the volume of such material. Spreader 14 is then inverted, as shown in FIG. 2, and secured to storage bin 30, for example by screw threads or a bayonet-type catch. The height of storage bin 30 is sufficiently high so that spreader 14 can be set on top of storage bin 30 without control 20 interfering with the ground.

After storage bin 30 is securely connected to hopper 16, the combined assembly is inverted into the position shown in FIG. 3. Spreader 14 and control 20 are then used in the conventional manner to disperse granular material 12 onto the ground. However, the increased capacity of storage bin 30 permits two to three or more hopperfuls of granular material to be dispersed without having to refill hopper 16. A separate gauge 40b is provided which is inverted with respect to gauge 40a. For example, gauge 40b indicates the current volume of granular material remaining in the lower extent of storage bin 30 and within hopper 16. Gauge 40b can then be used to monitor the dispensing rate of granular material.

After dispensing the granular material, the assembly is inverted so that it is supported by storage bin 30. In the inverted orientation, granular material 12 naturally falls out of hopper 16 into storage bin 30. Spreader 14 is disengaged from storage bin 30, cleaned and stored. Lid 32 is attached to storage bin 30 to prevent the granular material from spilling and to prevent moisture from coming in contact with the granular material.

Accordingly, while only a single embodiment of the present invention has been shown and described, it is obvious that many changes and modifications may be made thereunto without departing from the spirit and scope of the invention.

What is claimed is:

1. A method for transferring and dispensing granular material onto a surface comprising the steps of:

inverting a hand-operated spreader on top of a storage bin with an open top end containing granular material;

connecting said spreader to the open top end of the storage bin; and inverting the spreader with connected storage bin to dispense the granular material onto the surface.

2. The method of claim 1, further comprising the steps of:

inverting the spreader with connected storage bin;

disconnecting said spreader from the open top end of the storage bin; and covering the storage bin to store any remaining granular material.

3. The method of claim 2, wherein said step of connecting said spreader comprises screwing said spreader onto said open top end of said storage bin and said step of disconnecting said spreader comprises unscrewing said spreader from said open top end of said storage bin.

4. The method of claim 2, wherein the spreader is connected to and disconnected from the storage bin with a bayonet catch.

* * * * *